United States Patent [19]

Bertelli et al.

[11] Patent Number: 4,710,528

[45] Date of Patent: Dec. 1, 1987

[54] FLAME RESISTANT THERMOPLASTIC POLYMERIC COMPOSITIONS COMPRISING (1) MELAMINE BROMOHYDRATE AND (2) SB OR AS COMPOUND ENDOWED WITH IMPROVED FLAME-RESISTANCE

[75] Inventors: Guido Bertelli; Renato Locatelli, both of Ferrara, Italy

[73] Assignee: Himont Incorporated, Wilmington, Del.

[21] Appl. No.: 857,635

[22] Filed: Apr. 29, 1986

[30] Foreign Application Priority Data

Apr. 30, 1985 [IT] Italy .............................. 20548 A/85

[51] Int. Cl.⁴ .......................... C08K 3/10; C08K 3/20; C08K 5/34
[52] U.S. Cl. .................................... 524/100; 524/408; 524/409
[58] Field of Search .................. 524/100, 408, 409

[56] References Cited

U.S. PATENT DOCUMENTS

| | | | |
|---|---|---|---|
| 4,001,177 | 1/1977 | Tsutsumi et al. | 524/100 |
| 4,197,235 | 4/1980 | Nield et al. | 524/100 |
| 4,263,203 | 4/1981 | Hata et al. | 524/100 |
| 4,312,805 | 1/1982 | Bertelli et al. | 524/100 |
| 4,409,347 | 10/1983 | Rottmaier et al. | 524/100 |
| 4,446,061 | 5/1984 | Joyce et al. | 524/567 |

*Primary Examiner*—Herbert J. Lilling

[57] ABSTRACT

Polymeric compositions endowed with improved self-extinguishing properties, comprising by weight:

(A) from 60 to 98.9% of a thermoplastic polymer;
(B) from 0.1 to 10% of an antimony and/or bismuth compound;
(C) from 0 to 1% of a promoter of free radicals;
(D) from 1 to 30% of melamine bromohydrate.

5 Claims, No Drawings

FLAME RESISTANT THERMOPLASTIC POLYMERIC COMPOSITIONS COMPRISING (1) MELAMINE BROMOHYDRATE AND (2) SB OR AS COMPOUND ENDOWED WITH IMPROVED FLAME-RESISTANCE

BACKGROUND OF THE INVENTION

Different methods to provide polymers with flame-resistance are known in the art: said methods are generally based on the addition to the polymer of heat-unstable halogenated compounds associated with metallic compounds, expecially antimony and/or bismuth compounds.

Generally, the combinations between metallic compound and halogenated compound give satisfactory results as far as the characteristics of flame-resistance are concerned, but they involve more or less serious inconveniences and particularly:

corrosion phenomena in the equipments wherein the treatment of polymers containing the above mentioned additives is carried out;

worsening in the release of darkening smokes during combustion and/or decomposition of said polymers.

It is also known that ammonium salts of hydroacids generally have an effective action as flame-retarders in many fields such as the field of paints and coatings, but they cannot be used directly as additives in thermoplastic polymers due to their high corrosive action with respect to metals, their extreme sensitivity to water and air humidity and their poor thermal and thermo-oxidizing stability.

THE PRESENT INVENTION

It has been now surprisingly found that most of the thermoplastic polymers commonly used today can reach good levels of flame resistance when additioned with a combination of melamine bromohydrate with antimony and/or bismuth compounds such as those hereinafter mentioned, optionally combined with small amounts of promoter of free-radicals without incurring any of the previously described inconveniences.

Therefore, the object of the present invention is to provide polymeric compositions endowed with self-extinguishing properties, comprising by weight:
(A) from 60 to 98.9% of a synthetic thermoplastic polymer;
(B) from 0.1 to 10% of at least a product selected from antimony oxide, antimony oxychloride, antimony trisulfide, metal bismuth and an organic or inorganic, oxygenated or non-oxygenated bismuth salt;
(C) from 0 to 1% of a promotor of free radicals;
(D) from 1 to 30% of melamine bromohydrate.

In such compositions, melamine bromohydrate is preferably present in the amount of 3–5% by weight. When the promotor of free radicals is absent, the amount of melamine bromohydrate in the above mentioned compositions is preferably equivalent to or exceeding 15% by weight on the composition.

Among bismuth salts it is possible to mention as preferred ones bismuth oxychloride, bismuth nitrate, bismuth basic nitrate, bismuth carbonate, bismuth sulfate, bismuth trisulfide, bismuth phosphate, bismuth basic salycilate and bismuth acetate.

Examples of thermoplastic polymers to be possibly used in the compositions of the present invention are olefinic polymers such as for instance polypropylene, polypropylene modified with ethylene, ethylene/propylene copolymers, mixtures of polypropylene with up to 20% by weight of ethylene/propylene elastomeric copolymers containing up to 50% by weight of copolymerized ethylene and furthermore polystyrene (crystal and shockproof), ABS resins, polyamides and polyester resins.

Examples of promoters of free radicals to be possibly used are 2,3-dimethyl-2,3-diphenyl butane and 2,3-dimethyl-2,3-diphenylhexane. Organic peroxides can be also used as promotors of free radicals in the present compositions, preferably in amounts ranging between 0.05 and 0.1 parts by weight.

Melamine bromohydrate ground at few micron fineness also proves to be used for improving flame-resistance of fibers, raffia and in general of fabrics made of polypropylene and of other thermoplastic polymers hereinabove mentioned, provided that they are suitable to be spun under the usual conditions and according to the techniques known in the art.

Melamine bromohydrate can be prepared by allowing melamine to react with hydrobromic acid, in molar ratios of from 1/0.9 to 1/1.2, in an aliphatic alcohol containing 3 or 4 carbon atoms, which is preferably water unsoluble. An example of this preparation on industrial scale can be as follows: 700 kg of powdered melamine are dispersed in n-butyl alcohol (3,000 kg) in a glazed reactor and kept under stirring. Thereafter, 960 kg of hydrobromic acid in 47% aqueous solution are gradually added; the temperature must not overcome 45°–50° C.

The mixture is kept under stirring for one hour, at room temperature; the product is centrifuged and dried in a worm screw rotary drier; the melamine bromohydrate is thus obtained in form of fine white powder.

For the purposes of the present invention, the use of melamine bromohydrate as a composition comprising melamine bromohydrate, containing up to 10% by mols of free melamine not salified with HBr, 3–5% by weight of stearic acid (which can be added during the drying of melamine bromohydrate) and optionally, but not necessarily, from 2 to 3% by weight of micronized silica, having a 1–2 micron granule size, such as for instance silica known on the market as "Syloid 72" (manufacturer Italian Grace Co) was proved particularly useful.

The compositions of the present invention can be prepared according to conventional methods, for instance by mixing the polymer with additives in a Banbury mixer, at a temperature equal or exceeding the polymer softening temperature and then by extruding the mixture in an extruder, at the most suitable temperature to obtain a product in granules.

To determine the self-extinguishing properties of the compositions, test pieces (3 mm thickness) are moulded by means of a Carver type press, by working at a temperature at least equivalent to the softening temperature of the polymer, under a pressure of 40 kg/cm$^2$, for 7 minutes.

The flame-resistance degree is determined on the thus obtained test pieces by means of the "Oxygen index" measure (according to ASTM-D 2863 specification) which gives the minimum percentage of oxygen in mixture with nitrogen necessary for the test piece to burn continuously, as well as by complying with UL-94 specifications (published by Underwriters Laboratories—U.S.A.) which provide an evaluation of the extinguishing degree of plastic materials. In applying such specifications, the "Vertical Burning test" has been adopted. This test allows to classify the materials at 94V-0, 94V-1 and 94V-2 levels on the basis of test pieces combustion time and on the basis of the fact that they do or not drop inflamed particles. According to said method the test piece is primed, keeping it in vertical positions, approaching the flame to its lower end and performing two ignition attempts, each of them lasting 10 seconds.

Each test is performed on a group of 5 test pieces, also carrying out measurement of the extinction time for 4 subsequent ignition on the same test piece, as further differentiating criterium.

Tables from 1 to 5 report Examples which illustrate the compositions of the invention, without any limitative purpose. The compositions of each example were prepared as previously described, using a Dolci screw extruder provided with a 20 mm diameter screw, length/diameter ratio of the screw 23 and screw operating speed = 20 r.p.m. at a temperature of 200°–240° C.

TABLE 1

| | | | | | | | | | | |
|---|---|---|---|---|---|---|---|---|---|---|
| Polypropylene | 97.8 | 97.7 | 97.6 | 97.5 | 97.3 | 97.7 | 97.6 | 97.5 | 97.4 | 97.2 |
| melamine bromohydrate | 1.5 | 1.5 | 1.5 | 1.5 | 1.5 | 1.5 | 1.5 | 1.5 | 1.5 | 1.5 |
| 2,3-diphenyl-2,3-dimethyl butane | 0.2 | 0.2 | 0.2 | 0.2 | 0.2 | — | 0.1 | 0.2 | 0.3 | 0.5 |
| stabilizers (*) | 0.5 | 0.5 | 0.5 | 0.5 | 0.5 | 0.5 | 0.5 | 0.5 | 0.5 | 0.5 |
| antimony sesquioxide | — | 0.1 | 0.2 | 0.3 | 0.5 | 0.3 | 0.3 | 0.3 | 0.3 | 0.3 |
| Oxygen index | 24 | 25.5 | 27 | 26.5 | 25 | 19.5 | 25.5 | 26.5 | 25.5 | 23.5 |
| UL-94 (3 mm) | $V_2$ | $V_2$ | $V_2$ | $V_2$ | $V_2$ | B | $V_2$ | $V_2$ | $V_2$ | $V_2$ |
| extinction times for 4 subsequent ignitions | 3" 5" 8" 10" | 4" 7" 5" 6" | 2" 2" 3" 2" | 3" 3" 3" 4" | 5" 3" 2" 2" | — — — — | 5" 8" 4" 5" | 3" 3" 3" 4" | 2" 5" 7" 5" | 5" 8" 7" 9" |

(*) 0.2 part of Irganox 1010
0.3 part of TPL
B = burns completely
$V_2$ = extinguishes within 30 seconds dropping inflamed particles.

TABLE 2

| | | | | | | | | |
|---|---|---|---|---|---|---|---|---|
| Polypropylene | 99.5 | 97.8 | 97.6 | 97.6 | 91.5 | 91.1 | 90.9 | 90.9 |
| ethylene/propylene copolymer (*) | — | — | — | — | 5 | 5 | 5 | 5 |
| melamine bromohydrate | — | 1.5 | 1.5 | 1.5 | 3 | 3 | 3 | 3 |
| 2,3-diphenyl-2,3-dimethyl butane | — | 0.2 | 0.2 | 0.2 | — | 0.4 | 0.4 | 0.4 |
| stabilizers (°) | 0.5 | 0.5 | 0.5 | 0.5 | 0.5 | 0.5 | 0.5 | 0.5 |
| antimony sesquioxide | — | — | 0.2 | — | — | — | 0.2 | — |
| bismuth basic carbonate | — | — | — | 0.2 | — | — | — | 0.2 |
| Oxygen index | 17.5 | 24 | 27 | 31.5 | 17.5 | 23.5 | 26.5 | 30 |
| UL-94 (3 mm) | B | $V_2$ | $V_2$ | $V_2$ | B | $V_2$ | $V_2$ | $V_2$ |
| extinction times for 4 subsequent ignitions | — — — — | 3" 5" 8" 10" | 2" 2" 3" 2" | 2" 1" 1" 2" | — — — — | 5" 7" 8" 9" | 3" 1" 2" 4" | 1" 2" 1" 1" |

(*) $C_2 = 57\%$; $C_3 = 43\%$ by weight
(°) 0.2 part of Irganox 1010
0.3 part of TPL
B = burns completely
$V_2$ = extinguishes within 30 seconds dropping inflamed particles

TABLE 3

| | | | | | | |
|---|---|---|---|---|---|---|
| Polypropylene | 81.5 | 75.5 | 69.5 | 63.5 | 57.5 | 57.5 |
| Melamine bromohydrate | 15 | 20 | 25 | 30 | 35 | 35 |
| antimony sesquioxide | 3 | 4 | 5 | 6 | 7 | — |
| bismuth basic carbonate | — | — | — | — | — | 7 |
| stabilizers (*) | 0.5 | 0.5 | 0.5 | 0.5 | 0.5 | 0.5 |
| Oxygen index | 25.5 | 26.1 | 26.6 | 27 | 28 | 30 |
| UL-94 (3 mm) | $V_2$ | $V_2$ | $V_2$ | $V_1$ | $V_0$ | $V_0$ |

(*) 0.2 part of Irganox 1010
0.3 part of TPL
$V_2$ = extinguishes within 30 seconds dropping inflamed particles
$V_0$ = extinguishes within 5 seconds and does not drop inflamed particles

TABLE 4

| | | | | | | |
|---|---|---|---|---|---|---|
| Polystyrene crystal | 96.7 | 96.4 | 96.4 | — | — | 70 |
| ABS | — | — | — | — | 70 | — |
| Nylon 6 | — | — | — | 96.4 | — | — |
| melamine bromohydrate | 3 | 3 | 3 | 3 | 20 | 20 |
| 2,3-diphenyl-2,3-dimethylbutane | 0.3 | 0.3 | 0.3 | 0.3 | — | — |
| antimony sesquioxide | — | 0.3 | — | 0.3 | 10 | 10 |
| bismuth basic carbonate | — | — | 0.3 | — | — | — |
| Oxygen index | 23.5 | 25.5 | 25.5 | 26 | 25 | 25.5 |
| UL-94 (3 mm) | $V_2$ | $V_2$ | $V_2$ | $V_2$ | $V_0$ | $V_0$ |
| extinction times for 4 subsequent ignitions | 8" 10" 10" 12" | 2" 1" 2" 2" | 2" 2" 2" 1" | 1" 1" 0.5" 1" | 2" 2" 2" 3" | 3" 2" 1" 3" |

$V_2$ = extinguishes within 30 seconds dropping inflamed particles
$V_0$ = extinguishes within 5 seconds and does not drop inflamed particles

TABLE 5

| | | | | | | |
|---|---|---|---|---|---|---|
| Polypropylene | 97.6 | 97.6 | 97.6 | 97.6 | 97.6 | 97.6 |
| melamine bromohydrate | 1.5 | 1.5 | 1.5 | 1.5 | 1.5 | 1.5 |
| 2,3-diphenyl-2,3-dimethylbutane | 0.2 | 0.2 | 0.2 | 0.2 | 0.2 | 0.2 |
| stabilizers (*) | 0.5 | 0.5 | 0.5 | 0.5 | 0.5 | 0.5 |
| antimony oxychloride | 0.2 | — | — | — | — | — |
| antimony pentasulfide | — | 0.2 | — | — | — | — |
| bismuth powder | — | — | 0.2 | — | — | — |
| bismuth silicate | — | — | — | 0.2 | — | — |
| bismuth basic salycilate | — | — | — | — | 0.2 | — |

TABLE 5-continued

| | | | | | | |
|---|---|---|---|---|---|---|
| bismuth basic nitrate | — | — | — | — | — | 0.2 |
| Oxygen index | 26.5 | 24.5 | 27.5 | 27 | 31.7 | 28.5 |
| UL-94 (3 mm) | V₂ | V₂ | V₂ | V₂ | V₂ | V₂ |
| extinction times | 3" 2" | 7" 10" | 1" 1" | 2" 1" | 0.5" 1" | 1" 1" |
| for 4 subsequent ignitions | 3" 5" | 3" 8" | 1" 3" | 1" 1" | 1" 1" | 1" 3" |

(*) 0.2 part of Irganox 1010
0.3 part of TPL
V₂ = extinguishes within 30 seconds dropping inflamed particles.

What we claim is:

1. Polymeric compositions endowed with improved self-extinguishing properties, consisting essentially of by weight:
   (A) from 57.5 to 98.9% of a thermoplastic polymer;
   (B) from the group consisting of 0.1 to 10% of at least a product selected from antimony oxide, antimony oxychloride, antimony trisulfide, metal bismuth and one organic or inorganic oxygenated or non-oxygenated bismuth salt;
   (C) from 0 to 1% of a promoter of free radicals;
   (D) from 1 to 35% of melamine bromohydrate.

2. Compositions according to claim 1, wherein bismuth salt is selected from the group consisting of oxychloride, silicate, basic carbonate, basic nitrate, basic salycilate acetate, nitrate, phosphate, sulfate and trisulfide.

3. Compositions according to claim 1, wherein the thermoplastic polymer is selected from the group consisting of an olefinic polymer, polystyrene, polyamide, polyester resin and an ABS copolymer.

4. Compositions according to claim 1, wherein melamine bromohydrate is present in amounts ranging from 3 to 5% by weight.

5. Compositions according to claim 3, wherein the thermoplastic polymer is an olefinic polymer selected from the group consisting of polypropylene, polypropylene modified with ethylene, ethylene/propylene copolymers, mixtures of polypropylene with up to 20% by weight of ethylene/propylene elastomeric copolymers having up to 50% by weight of copolymerized ethylene.

REEXAMINATION CERTIFICATE (1711th)
United States Patent [19]
Bertelli et al.

[11] B1 4,710,528
[45] Certificate Issued Jun. 2, 1992

[54] FLAME RESISTANT THERMOPLASTIC POLYMERIC COMPOSITIONS COMPRISING (1) MELAMINE BROMOHYDRATE AND (2) AN SB AND/OR BI COMPOUND ENDOWED WITH IMPROVED FLAME-RESISTANCE

[75] Inventors: Guido Bertelli; Renato Locatelli, both of Ferrara, Italy

[73] Assignee: Himont Incorporated, Wilmington, Del.

Reexamination Request:
No. 90/002,472, Oct. 9, 1991

Reexamination Certificate for:
Patent No.: 4,710,528
Issued: Dec. 1, 1987
Appl. No.: 857,635
Filed: Apr. 29, 1986

[30] Foreign Application Priority Data
Apr. 30, 1985 [IT] Italy .................. 20548 A/85

[51] Int. Cl.$^5$ .......... C08K 3/10; C08K 3/20; C08K 5/34
[52] U.S. Cl. .................. 524/100; 524/408; 524/409
[58] Field of Search .................. 524/100

[56] References Cited
U.S. PATENT DOCUMENTS
4,028,333 6/1977 Lindvay .................. 524/100

Primary Examiner—Paul R. Michl

[57] ABSTRACT

Polymeric compositions endowed with improved self-extinguishing properties, comprising by weight: (A) from 60 to 98.9% of a thermoplastic polymer; (B) from 0.1 to 10% of an antimony and/or bismuth compound; (C) from [0] *0.05* to 1% of a promoter of free radicals; (D) from 1 to [30] *35*% of melamine bromohydrate.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 35–42:

It has been now surprisingly found that most of the thermoplastic polymers commonly used today can reach good levels of flame resistance when additioned with a combination of melamine bromohydrate with antimony and/or bismuth compounds such as those hereinafter mentioned, [optionally] combined with small amounts of *a* promoter of free-radicals without incurring any of the previously described inconveniences.

Column 1, lines 43–53:

Therefore, the object of the present invention is to provide polymeric compositions endowed with self-extinguishing properties, comprising by weight:

(A) from 60 to 98.8% of a synthetic thermoplastic polymer;

(B) from 0.1% to 10% of at least a product selected from antimony oxide, antimony oxychloride, antimony trisulfide, metal bismuth and an organic or inorganic, oxygenated or non-oxygenated bismuth salt;

(C) from [0] *0.05* to 1% of a [promotor] *promoter* of free radicals;

(D) from 1 to [30] *35*% of melamine bromohydrate.

Column 1, lines 54–59:

In such compositions, melamine bromohydrate is preferably present in the amount of 3–5% by weight. [When the promotor of free radicals is absent, the amount of melamine bromohydrate in the above mentioned compositions is preferably equivalent to or exceeding 15% by weight of the composition.]

Column 2, lines 7–12:

Examples of promoters of free radicals to be [possibly] used are 2,3-dimethyl-2,3-diphenyl butane and 2,3-dimethyl-2,3-diphenylhexane. Organic peroxides can be also used as [promotors] *promoters* of free radicals in the present compositions, preferably in amounts ranging between 0.05 to 0.1 parts by weight.

AS A RESULT OF REEXAMINATION, IT HAS BEEN DETERMINED THAT: Claims 1 and 2 are determined to be patentable as amended. Claims 3, 4 and 5 dependent on an amended claim are determined to be patentable.

New claim 6 is added and determined to be patentable.

1. Polymeric compositions endowed with improved self-extinguishing properties, consisting essentially of, by weight:

(A) from 57.5 to 98.9% of a thermoplastic polymer;

(B) from [the group consisting of] 0.1 to 10% of at least [a] *one* product selected from *the group consisting of* antimony oxide, antimony oxychloride, antimony trisulfide, [metal] *metallic* bismuth and [one] *an* organic or inorganic oxygenated or nonoxygenated bismuth salt;

(C) from [0] *0.05* to 1% of a promoter of free radicals; *and*

(D) from 1 to 35% to melamine bromohydrate.

2. Compositions according to claim 1, wherein *the* bismuth salt is selected from the group consisting of oxychloride, silicate, basic carbonate, basic nitrate, basic [salycilate] *salicylate*, acetate, nitrate, phosphate, sulfate and trisulfide.

*6. Compositions according to claim 1 wherein the promoter of free radicals is a member of the group consisting of 2,3-dimethyl-2,3-diphenylbutane, 1,2,3-dimethyl-2,3-diphenylhexane, and an organic peroxide.*

* * * * *